United States Patent
Mizuma et al.

(10) Patent No.: US 12,432,438 B2
(45) Date of Patent: Sep. 30, 2025

(54) DRIVE RECORDER

(71) Applicant: TOYOTA JIDOSHA KABUSHIKI KAISHA, Toyota (JP)

(72) Inventors: Hayato Mizuma, Tokyo (JP); Makoto Matsushita, Ichinomiya (JP); Yuko Mizuno, Nagoya (JP); Kohei Miwa, Shizuoka-ken (JP); Naoki Yamada, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 18/438,871

(22) Filed: Feb. 12, 2024

(65) Prior Publication Data

US 2024/0397189 A1   Nov. 28, 2024

(30) Foreign Application Priority Data

May 25, 2023   (JP) .................... 2023-086353

(51) Int. Cl.
 *H04N 23/61*  (2023.01)
 *G01C 21/00*  (2006.01)
 *G01C 21/36*  (2006.01)
 *H04N 23/60*  (2023.01)

(52) U.S. Cl.
 CPC ......... *H04N 23/61* (2023.01); *G01C 21/3679* (2013.01); *G01C 21/3811* (2020.08); *G01C 21/3837* (2020.08); *H04N 23/64* (2023.01)

(58) Field of Classification Search
 CPC .... H04N 23/61; H04N 23/64; G01C 21/3679; G01C 21/3811; G01C 21/3837; G07C 5/0866; G07C 5/0891
 See application file for complete search history.

(56) References Cited

U.S. PATENT DOCUMENTS

| | | | |
|---|---|---|---|
| 2019/0037118 A1* | 1/2019 | Oh | H04N 23/71 |
| 2019/0141282 A1 | 5/2019 | Jin et al. | |
| 2021/0014409 A1* | 1/2021 | Park | H04N 5/77 |
| 2022/0299340 A1* | 9/2022 | Ikeda | G01C 21/3807 |

FOREIGN PATENT DOCUMENTS

| | | |
|---|---|---|
| JP | 2017-194898 A | 10/2017 |
| JP | 7028608 B2 | 3/2022 |

* cited by examiner

*Primary Examiner* — Tat C Chio
(74) *Attorney, Agent, or Firm* — SoraIP, Inc.

(57) ABSTRACT

A drive recorder mounted on a vehicle includes a camera and a processing device. When the processing device recognizes that a landmark appears in the image shot by the camera, the processing device performs a process of setting the shutter speed and shooting timing for taking a photo of the landmark based on the vehicle speed, and A process of shooting a landmark at the shutter speed and shooting timing is executed.

1 Claim, 2 Drawing Sheets

DRIVE RECORDER

CROSS-REFERENCE TO RELATED APPLICATION

This application claims priority to Japanese Patent Application No. 2023-086353filed on May 25, 2023, incorporated herein by reference in its entirety.

BACKGROUND

1. Technical Field

The disclosure relates to a drive recorder installed in a vehicle.

2. Description of Related Art

Japanese Unexamined Patent Application Publication No. 2017-194898 (JP 2017-194898 A) discloses a system that gives tourist guidance by audio when an object regarding which tourist guidance is to be given is shot by a drive recorder installed in a vehicle.

SUMMARY

Landmarks are known as objects regarding which tourist guidance is to be given. Such landmarks are prominent buildings or landscapes. Now, it is difficult for a driver of the vehicle to shoot photographs of landmarks while the vehicle is traveling.

A drive recorder for solving the above problems is installed in a vehicle and includes a camera and a processing device.

When recognizing that a landmark is in an image shot by the camera, the processing device sets a shutter speed and a shooting timing for shooting a photograph of the landmark based on vehicle speed.

The processing device shoots the photograph at the shutter speed and the shooting timing.

This drive recorder is capable of shooting photographs of landmarks even while the vehicle is traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, one embodiment of a drive recorder mounted on a vehicle will be described with reference to FIGS. 1 and 2.

Configuration of Vehicle

Figure 1:
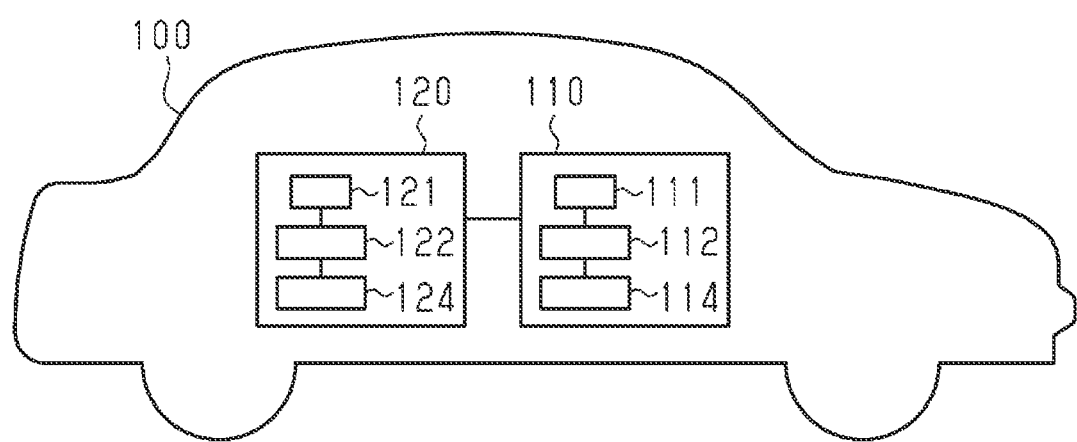
FIG. 1 is a schematic diagram showing the configuration of a vehicle equipped with a drive recorder according to an embodiment.

As shown in FIG. 1, vehicle 100 includes a drive recorder 110 and an automotive navigation system 120.

The drive recorder 110 includes a camera 111, a processing device 112, and a storage 114. The camera 111 shoots an image of the front of the vehicle that can be seen from inside the vehicle cabin. The processing device 112 executes various processes by executing programs stored in a ROM or the like. Note that the processing device 112 includes a processor. The processing device 112 analyzes the image shot by the camera 111. For example, the processing device 112 determines whether a landmark is shown in the video shot by the camera 111 by image analysis. A landmark is a famous building or landscape. The storage 114 stores images shot by the camera 111 and the like.

The automotive navigation system 120 includes a display 121, a processing device 122, and a storage 124 that stores data such as map information. The processing device 122 includes a processor, and executes various processes by executing programs stored in a ROM or the like. In addition, the automotive navigation system 120 includes a receiver for a satellite positioning system, a communication device for communicating with an external server, an input device, and the like.

Drive recorder 110 and automotive navigation system 120 are connected so that they can exchange information with each other.

Processing executed by the drive recorder processing device

Figure 2:
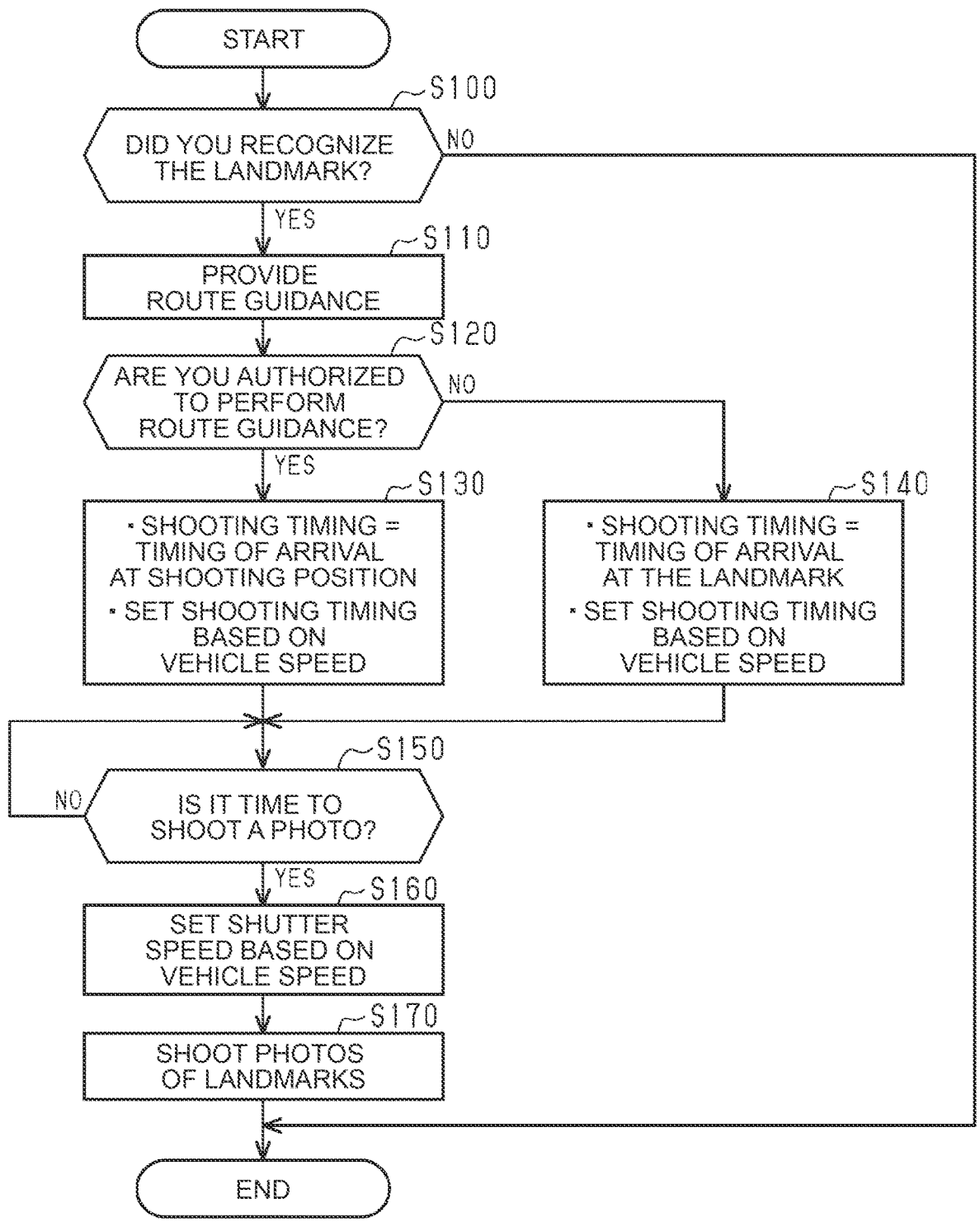
FIG. 2 is a flowchart showing the processing procedure executed by the processing device of the drive recorder.

FIG. 2 shows a processing procedure that the processing device 112 of the drive recorder 110 executes at predetermined intervals. Note that in the following, the step number of each process is expressed by a number prefixed with "S".

When starting this process, the processing device 112 determines whether a landmark has been recognized (S100). In the process of S100, the processing device 112 executes the following process, for example. First, the processing device 112 acquires images of landmarks around the current position of the vehicle 100 from the storage 124 of the automotive navigation system 120, and uses the acquired images as determination images. Next, the processing device 112 performs a matching analysis between the video data shot by the camera 111 and the determination image to determine whether a landmark is shown in the video shot by the camera 111. If it is determined that the landmark is shown in the image shot by the camera 111, the processing device 112 determines that the landmark has been recognized. On the other hand, if it is determined that the landmark is not shown in the image shot by the camera 111, the processing device 112 determines that the landmark is not recognized.

Next, the processing device 112 instructs the automotive navigation system 120 to provide route guidance to a shooting position suitable for shooting the landmark (S110). Information on shooting positions suitable for shooting landmarks is registered in advance in the map information possessed by the automotive navigation system 120. Note that the information on the shooting position may be obtained from an external server via communication. Furthermore, the shooting position suitable for shooting a landmark includes, for example, a shooting position of a landmark where a good-looking photograph can be taken.

Next, the processing device 112 determines whether execution of route guidance to the shooting position is permitted by the vehicle occupant (S120). In the process of S120, for example, the processing device 122 displays a message on the display 121 of the automotive navigation system 120 to request an answer as to whether to execute route guidance. In response to this inquiry, if the vehicle occupant performs an operation to permit execution of route guidance, the processing device 122 determines that execution of route guidance is permitted. The automotive navigation system 120 then starts providing route guidance to the shooting position. On the other hand, if the driver or the like performs an operation that does not permit execution of route guidance, the processing device 122 determines that execution of route guidance is not permitted. Then, the automotive navigation system 120 does not perform route guidance to the shooting position.

In the process of S120, if it is determined that execution of route guidance is permitted (S120: YES), the processing device 122 executes the process of S130. In the process of S130, the processing device 122 sets the arrival timing at which the vehicle 100 arrives at the shooting position as the shooting timing. Furthermore, in the process of S130, the processing device 122 sets the shooting timing based on the vehicle speed SP of the vehicle 100 and the like. The shooting timing is the timing for shooting the recognized landmark with the camera 111. As this shooting timing, for example, the time required for the position of the vehicle 100 to come within a predetermined range from the shooting position is set. This time is calculated based on the distance from the vehicle 100 to the shooting position, which is calculated from the position information of the vehicle 100 and the position information of the shooting position, and the vehicle speed SP.

On the other hand, in the process of S120, if it is determined that execution of route guidance is not permitted (S120: NO), the processing device 122 executes the process of S140. In the process of S140, the processing device 122 sets the arrival timing at which the vehicle 100 arrives at the recognized landmark as the shooting timing. Furthermore, in the process of S130, the processing device 122 sets the shooting timing based on the vehicle speed SP of the vehicle 100 and the like. This shooting timing is also the timing for shooting the recognized landmark with the camera 111. As this shooting timing, for example, the time required for the position of the vehicle 100 to come within a predetermined range from the position of the recognized landmark is set. This time is calculated based on the distance from the vehicle 100 to the landmark, which is calculated from the position information of the vehicle 100 and the position information of the landmark, and the vehicle speed SP.

When the shooting timing is set in the process of S130 or the process of S140, the processing device 112 determines whether the current timing is the shooting timing (S150). If it is determined that it is not the shooting timing (S150: NO), the processing device 112 repeatedly executes the process of S130 until it is determined that the current timing is the shooting timing.

In the process of S150, if it is determined that it is the shooting timing (S150: YES), the processing device 112 sets the shutter speed when taking a photo of the landmark with the camera 111 based on the current vehicle speed SP (S160). In the process of S160, the processing device 112 sets the shutter speed so that the higher the vehicle speed SP is, the faster the shutter speed is set.

Next, the processing device 112 shoots a photo of the landmark (S170). In the process of S170, the processing device 112 shoots a picture of the recognized landmark by operating the camera 111 using the shutter speed set in the process of S160, and saves the shot data in the storage 114. do. Note that the shot data may be uploaded to an external server and stored therein.

Then, when the process of S170 is finished, or when a negative determination is made in the process of S100, the processing device 122 temporarily ends this process.

Action and Effect

The operation and effects of this embodiment will be explained.

(1) When a landmark is shown in the image shot by the camera 111, the process of S130 or the process of S140 shown in FIG. 2 is executed to determine the shooting timing for taking a photo of the landmark. is set based on the vehicle speed SP. Further, by executing the process of S160 shown in FIG. 2, the shutter speed for shooting a photograph 20 of the landmark is set based on the vehicle speed SP. Then, by executing the process of S170 shown in FIG. 2, a photograph of the landmark is automatically photographed at the set shooting timing and shutter speed. Therefore, it is possible to shoot pictures of landmarks even while the vehicle is running.

(2) Photographs of landmarks can be shot even while the vehicle is running. Therefore, for example, the vehicle driver can shoot a photo of a landmark without having to park the vehicle 100 and get out of the vehicle 100. Furthermore, if you temporarily park the moving vehicle 100 and shoot a photo of a landmark after getting off the vehicle 100, the moving vehicle 100 will be parked once, so such a photo will be shot by the vehicle. There is a possibility that it will get in the way of driving the 100. In this regard, in this embodiment, since photos of landmarks are automatically shot, it is possible to avoid shooting such photos from interfering with driving.

(3) When it is recognized that a landmark is included in the image shot by the camera 111, the process of S110 shown in FIG. 2 is executed to move to a shooting position suitable for shooting the landmark. Route guidance is instructed to the automotive navigation system 120. Therefore, photos of landmarks can be shot at more appropriate positions.

(4) If route guidance to the shooting position is approved by the vehicle occupant, the process of S130 shown in FIG. 2 is executed, so that the timing at which the vehicle 100 arrives at the shooting position is the shooting timing. Therefore, a photograph of the landmark can be photographed at a shooting position suitable for shooting the landmark.

Example of Change

This embodiment can be modified and implemented as follows. This embodiment and the following modified examples can be implemented in combination with each other within a technically consistent range.

The automotive navigation system 120 executes route guidance when execution of route guidance is approved by the vehicle occupant. On the other hand, the automotive navigation system 120 may be configured to start route guidance without requiring permission from the vehicle occupant. This modification example can be realized by deleting each process of S120 and S140 shown in FIG. 2 and executing the process of S130 after the process of S110.

When the processing device 112 recognizes that a landmark is shown in the image shot by the camera 111, it instructs the automotive navigation system 120 to provide route guidance to the shooting position. In addition, each process related to such route guidance instructions may be omitted. This modification example can be implemented by deleting each process of S110, S120, and S130 shown in FIG. 2, and executing the process of S140 when an affirmative determination is made in the process of $100.

The processing device 112 is not limited to one that includes a processor and a ROM and executes software processing. For example, a dedicated hardware circuit such as an ASIC may be provided to process at least a part of what was processed by software in the above embodiments by hardware. That is, the processing device may have any of the following configurations (a) to (c). (a) It includes a processing device that executes all of the above processing according to a program, and a program storage device such as a ROM that stores the program. (b) It includes a processing device and a program storage device that execute part of the above processing according to a program, and a dedicated hardware circuit that executes the remaining processing. (c) A dedicated hardware circuit is provided to execute all of the above processing. Here, the number of software execution devices including a processing device and a program storage device, or a dedicated hardware circuit may be one or more than one. That is, the processing described above may be performed by a processing circuit comprising at least one of one or more software execution devices and one or more dedicated hardware circuits. Program storage devices or computer readable media include any available media that can be accessed by a general purpose or special purpose computer.

What is claimed is:

1. A drive recorder installed in a vehicle that comprises an automotive navigation system, the drive recorder comprising:
   a camera configured to shoot an image of a front of the vehicle; and
   a processor configured to:
   determine whether the camera recognizes a landmark in the image;
      in a case where the processor determines that the landmark is in the image, the processor is configured to instruct the automotive navigation system to provide a route guidance to a shooting position that is registered in map information that is in the automotive navigation system,
   determine whether execution of the route guidance to the shooting position is permitted by a vehicle occupant,
      in a case where the processor determines that the execution of the route guidance is permitted by the vehicle occupant, the processor is configured to set a timing at which the vehicle arrives at the shooting position as the shooting timing, and
      in a case where the processor determines that the execution of the route guidance is not permitted by the vehicle occupant, the processor is configured to set a timing at which the vehicle arrives at the recognized landmark as the shooting timing,
   determine whether it is the shooting timing,
      in a case where the processor determines that it is the shooting timing. the processor is configured to set the shutter speed at shooting the landmark with the camera based on vehicle speed of the vehicle at the shooting timing, and
   shoot the photograph of the recognized landmark with the camera using the set shutter speed.

* * * * *